(12) United States Patent
King et al.

(10) Patent No.: US 7,996,516 B2
(45) Date of Patent: Aug. 9, 2011

(54) SYSTEMS AND METHODS FOR AUTOMATIC CONFIGURATION OF DEVICES WITHIN A NETWORK UTILIZING INHERITED CONFIGURATION DATA

(75) Inventors: David L. King, Sandy, UT (US); W. Bryant Eastham, Draper, UT (US); Byron J. Gudmundson, Orem, UT (US); Mark E. Nelson, Lindon, UT (US)

(73) Assignee: Panasonic Electric Works Co., Ltd., Osaka (JP)

( * ) Notice: Subject to any disclaimer, the term of this patent is extended or adjusted under 35 U.S.C. 154(b) by 929 days.

(21) Appl. No.: 11/321,745

(22) Filed: Dec. 29, 2005

(65) Prior Publication Data

US 2007/0156857 A1    Jul. 5, 2007

(51) Int. Cl.
*G06F 15/173* (2006.01)
*G06F 15/177* (2006.01)
*G06F 15/16* (2006.01)
*H04L 12/28* (2006.01)

(52) U.S. Cl. ........ 709/224; 709/220; 709/221; 709/222; 709/223; 709/225; 709/226; 709/227; 709/228; 709/229; 370/254; 370/255

(58) Field of Classification Search .......... 370/254, 370/255; 709/220–229
See application file for complete search history.

(56) References Cited

U.S. PATENT DOCUMENTS

| | | | | |
|---|---|---|---|---|
| 3,659,036 A * | 4/1972 | Silver | | 174/58 |
| 4,010,431 A * | 3/1977 | Virani et al. | | 335/18 |
| 6,378,000 B1 * | 4/2002 | Akatsu et al. | | 709/245 |
| 6,611,537 B1 * | 8/2003 | Edens et al. | | 370/503 |
| 6,801,507 B1 * | 10/2004 | Humpleman et al. | | 370/257 |
| 6,856,236 B2 * | 2/2005 | Christensen et al. | | 340/3.5 |
| 6,961,763 B1 * | 11/2005 | Wang et al. | | 709/223 |
| 6,970,751 B2 | 11/2005 | Gonzales et al. | | |
| 6,980,080 B2 * | 12/2005 | Christensen et al. | | 340/3.5 |
| 7,235,739 B2 * | 6/2007 | King et al. | | 174/58 |
| 7,319,853 B2 * | 1/2008 | Luebke et al. | | 455/344 |
| 7,337,217 B2 * | 2/2008 | Wang | | 709/217 |
| 2003/0200297 A1 * | 10/2003 | Wiener | | 709/223 |

(Continued)

FOREIGN PATENT DOCUMENTS

JP    2000069575 A    *    3/2000

(Continued)

OTHER PUBLICATIONS

"Home Automation Interface with Selective Requests for Use with Low Power Personal Computer"; Apr. 1, 1997; IBM Technical Disclosure Bulletin, Apr. 1997; 40; pp. 177-180.*

Bigioi et al.; "Transparent, Dynamically Configurable RF Network Suitable for Home Automation Applications"; Jun. 22-24, 1999; IEEE, Piscataway, NJ, USA; 2000010; pp. 40-41.*

*Primary Examiner* — Nathan Flynn
*Assistant Examiner* — Kai J Chang
(74) *Attorney, Agent, or Firm* — Austin Rapp & Hardman

(57) ABSTRACT

Systems and methods for configuration of devices within a network utilizing inherited configuration data are disclosed. Configuration data stored at a junction box in electronic communication with a first device is accessed. The configuration data includes a default zone of interest assignment for a first device. The zone of interest comprises a portion of a network. Devices within the zone of interest are identified. It is determined whether the first device is compatible with any of the identified devices. The first device is configured, in an automated manner, to interact with a set of compatible devices within the zone of interest.

24 Claims, 10 Drawing Sheets

U.S. PATENT DOCUMENTS

| | | |
|---|---|---|
| 2004/0003051 A1 | 1/2004 | Krzyzanowski et al. |
| 2004/0215694 A1* | 10/2004 | Podolsky ..................... 709/201 |
| 2004/0260407 A1* | 12/2004 | Wimsatt ......................... 700/19 |
| 2005/0074018 A1* | 4/2005 | Zintel et al. ................... 370/401 |
| 2005/0096753 A1* | 5/2005 | Arling et al. ................... 700/11 |
| 2005/0131551 A1* | 6/2005 | Ruutu et al. ..................... 700/1 |
| 2005/0169214 A1 | 8/2005 | Suomela |
| 2006/0080408 A1* | 4/2006 | Istvan et al. .................. 709/219 |
| 2006/0092861 A1* | 5/2006 | Corday et al. ................ 370/256 |
| 2006/0126617 A1* | 6/2006 | Cregg et al. ................... 370/389 |
| 2006/0185878 A1* | 8/2006 | Soffer ............................. 174/50 |
| 2007/0112939 A1* | 5/2007 | Wilson et al. ................ 709/219 |
| 2008/0288618 A1* | 11/2008 | Vardi et al. .................... 709/223 |

FOREIGN PATENT DOCUMENTS

WO    2005/125155    12/2005

\* cited by examiner

SYSTEMS AND METHODS FOR AUTOMATIC CONFIGURATION OF DEVICES WITHIN A NETWORK UTILIZING INHERITED CONFIGURATION DATA

TECHNICAL FIELD

The present invention relates generally to computers and computer-related technology. More specifically, the present invention relates to automatic configuration of devices within a network.

BACKGROUND

Computer and communication technologies continue to advance at a rapid pace. Indeed, computer and communication technologies are involved in many aspects of a person's day. For example, many devices being used today by consumers have a small computer inside of the device. These small computers come in varying sizes and degrees of sophistication. These small computers include everything from one microcontroller to a fully-functional, complete computer system. For example, these small computers may be a one-chip computer, such as a microcontroller; a one-board type of computer, such as a controller; or a typical desktop computer, such as an IBM-PC compatible, etc.

Computers typically have one or more processors at the heart of the computer. The processor(s) are usually interconnected to different external inputs and outputs and function to manage the particular computer or device. For example, a processor in a thermostat may be connected to buttons used to select the temperature setting, to the furnace or air conditioner to change the temperature, and to temperature sensors to read and display the current temperature on a display.

Many appliances, devices, etc., include one or more small computers. For example, thermostats, furnaces, air conditioning systems, refrigerators, telephones, typewriters, automobiles, vending machines, and many different types of industrial equipment now typically have small computers, or processors, inside of them. Computer software runs the processors of these computers and instructs the processors how to carry out certain tasks. For example, the computer software running on a thermostat may cause an air conditioner to stop running when a particular temperature is reached or may cause a heater to turn on when needed.

These types of small computers that are a part of a device, appliance, tool, etc., are often referred to as embedded systems. The term "embedded system" usually refers to computer hardware and software that is part of a larger system. Embedded systems may not have typical input and output devices such as a keyboard, mouse, and/or monitor. Usually, at the heart of each embedded system is one or more processor(s).

Embedded systems may be utilized in a wide variety of different scenarios. For example, lighting systems may utilize embedded technology. In particular, an embedded system may be used to monitor and control a lighting system. For example, an embedded system could be used to dim or increase the brightness of an individual light or a set of lights within a lighting system. An embedded system may be used to create a specific lighting pattern by activating individual lights within the lighting system. Embedded systems may be coupled to individual switches within the lighting system. An embedded system may instruct the switches to power up or power down individual lights or the entire lighting system. The brightness or power state of each individual light may thus be controlled by the embedded system.

Security systems may likewise utilize embedded technology. An embedded system may be used to control and monitor the individual security sensors within a security system. An embedded system may provide controls to power up each of the security sensors automatically at a specific time of day or night. An embedded system may be coupled to a motion sensor. An embedded system may power up the individual motion sensor automatically and provide controls to activate a video camera and/or an alarm, if motion is detected. Embedded systems may also be coupled to sensors monitoring a door or a window and take specified action when activity is sensed.

Embedded technology may also be used to control wireless products, such as cell phones. An embedded system may provide instructions to power up the display of the cell phone. An embedded system may also activate the audio speakers within the cell phone to provide the user with an audio notification of an incoming call.

Home appliances, such as stoves, refrigerators, or microwave ovens, may also incorporate embedded technology. For example, a massage recliner may incorporate an embedded system to provide instructions to automatically recline the back portion of the chair according to the preferences of the user. An embedded system may also provide instructions to initiate the oscillating components within the chair according to the preferences of the user.

Additional products typically found in homes may also incorporate embedded systems. For example, an embedded system may be used within a toilet to control the level of water used to refill the water supply tank. Embedded systems may be used within a jetted bathtub to, for example, control the outflow of air.

Unfortunately, setup and configuration of an embedded device network can be extremely complex, time-consuming, and cumbersome. For example, consider the complexity of installing a light switch into an embedded device network within a large office building. The office building may include literally hundreds or thousands of lights. The installed switch may be configured to control any light or set of lights within the entire building. Identifying the lights within the pertinent room or area where the switch will be installed (and which the switch should naturally or by default control) can be time-consuming and produce significant frustration.

Accordingly, benefits may be realized by improved systems and methods for automatic configuration or devices within a network. Some exemplary systems and methods for providing automatic configuration of devices within a network are described herein.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
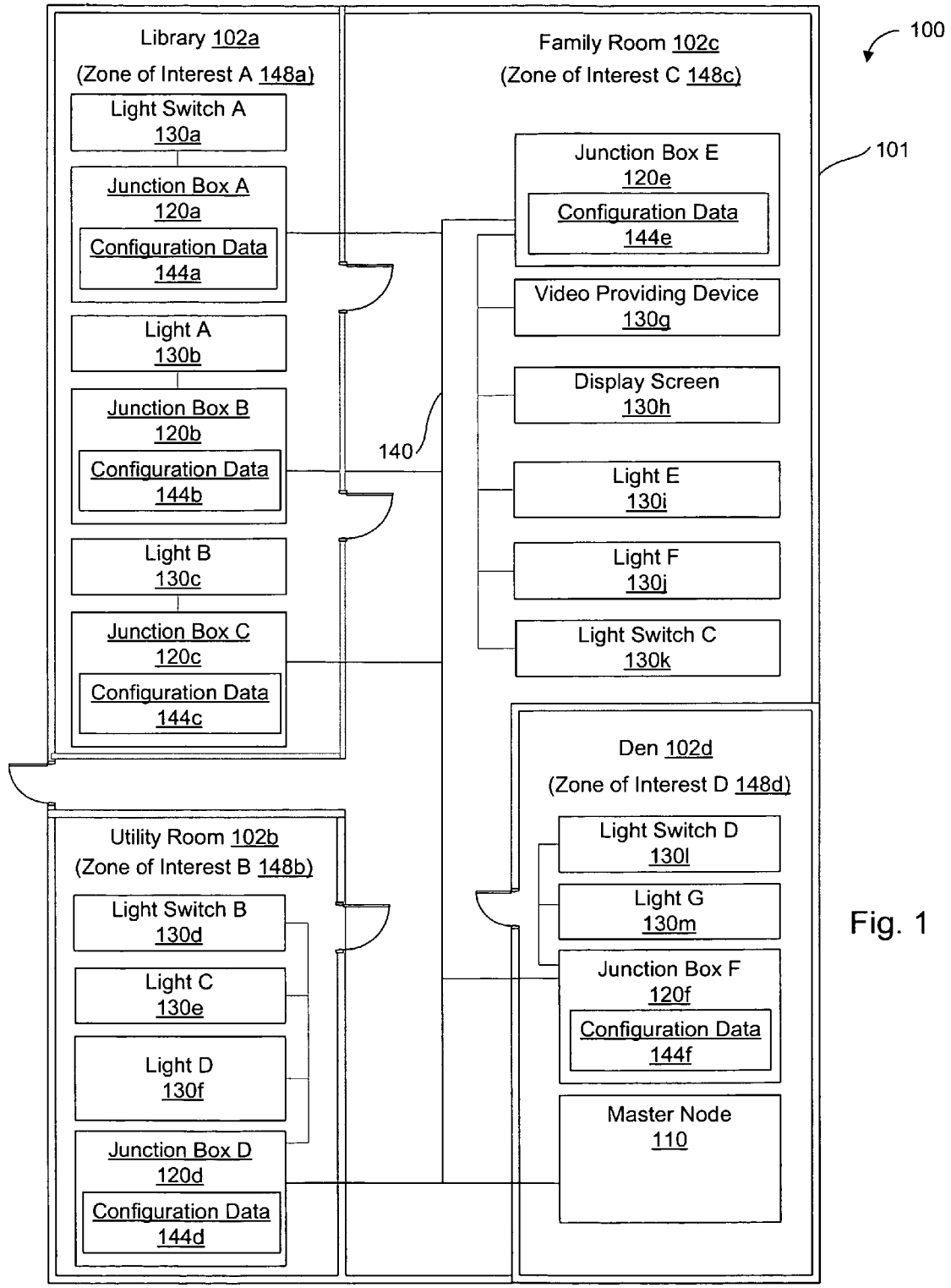
FIG. 1 is a block diagram of one embodiment of an automatic device configuration system shown within a home.

A method for automatic device configuration based on inherited configuration data is disclosed. Configuration data stored at a junction box in electronic communication with a first device is accessed. The configuration data includes a default zone of interest assignment for the first device. The zone of interest comprises a portion of a network. Devices within the zone of interest are identified. It is determined whether the first device is compatible with any of the identified devices. The first device is configured, in an automated manner, to interact with at least one of the devices within a set of compatible devices in the zone of interest.

The first device, in one embodiment, may control at least one aspect of a device within the set of compatible devices. For example, a first device may be a light switch and the set of compatible devices may comprise at least one light. The first device may be a video providing device and the set of compatible devices may include a display device.

The first device may be an embedded device. Also, the network may comprise an embedded device network. The junction box may be coupled to a single device or multiple devices.

A system that is configured to implement these methods is also disclosed. The system includes a junction box comprising configuration data, a first device in electronic communication with the junction box, a processor either comprised within or in electronic communication with the junction box or the first device, and memory in electronic communication with the processor. The system further includes instructions stored in the memory that are configured to perform the methods disclosed above. A computer-readable medium comprising instructions for performing the foregoing methods is also disclosed.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the term "computing device" refers to any type of electronic device having a processor, which typically performs arithmetic or logical operations. The computing device may include memory (e.g., random access memory (RAM)), flash memory, and/or a hard disk storage device). The computing device may process instructions stored in memory. A computing device may optionally include other components, such as communication interfaces (e.g., a network card or modem) for communicating with other devices, inputs for receiving user input (e.g., a keyboard, touchpad, or mouse) or outputs (e.g., audio outputs or a display screen) for providing information to a user. Additionally, it should be noted that a computing device may be embodied as different types of devices, such as a desktop computer, server, tablet PC, notebook computer, personal data assistant (PDA), cellular phone, or embedded device.

FIG. 1 is a block diagram of one embodiment of an automatic device configuration system 100 shown within a home 101. The depicted home 101 includes a library 102*a*, a utility room 102*b*, a family room 102*c*, and a den 102*d*. The diagram of FIG. 1 depicts the first floor of the home 101. For simplicity, the second or other floors of the home 101 are not shown.

The home 101 illustrated in FIG. 1 is, of course, only exemplary. The automatic device configuration system 100 may be utilized in various environments, such as an office building, an apartment complex, a neighborhood, a city, or an even larger geographic area.

The system 100 disclosed in FIG. 1 includes a master node 110, various junction boxes 120*a-f*, a number of automatically configurable devices 130, and a network 140. The master node 110 is a computing device that is in electronic communication with each of the junction boxes 120. Through each of the junction boxes 120, the master node 110 is also in electronic communication with each of the automatically configurable devices 130.

The master node 110 may control each of the junction boxes 120 and the automatically configurable devices 130 (e.g., change settings or states of each of the junction boxes 120 or the automatically configurable devices 130). For example, in one embodiment, all or some of the lights 130*b-c*, 130*e-f*, 130*i-j*, 130*m* within the home 101 may be turned off or on from the master node 110.

The master node 110, in one embodiment, may also determine the status of junction boxes 120 and/or automatically configurable devices 130. By way of example, the master node 110 may be used to determine which lights 130*b-c*, 130*e-f*, 130*i-j*, 130*m* within the home 101 are turned on or off.

The master node 110 may be embodied in various ways. For example, the master node 110 may be embodied as a personal computer, a tablet PC, a computing device having a wall-mounted touch screen, a server, a personal digital assistant (PDA), or any other device that may be utilized to transmit and receive messages via a network 140.

Junction boxes 120 may be structurally embodied in various ways. For example, a junction box 120 may be a box with one open side mounted within a wall or ceiling into which an automatically configurable device 130 (e.g., a light switch) may be inserted or plugged into. Alternatively, a junction box 120 could be a device of any shape to which wiring or cabling may be connected to place the box 120 in electronic communication with one or more automatically configurable devices 130. In other words, a junction box 120 could be any device or node within a network 140 through which other devices 130 may gain intelligence or information about their environment.

In one embodiment, a junction box 120 may include a processor and memory. Alternatively, a junction box 120 may not have a processor, but may include only memory, that stores data. In such an embodiment, the data could be retrieved and utilized by another device (such as a master node 110) that includes a processor.

A junction box 120 performs various functions within the system 100. For example, in one embodiment, a junction box 120 routes communications between multiple automatically configurable devices 130 and the master node 110 or other devices, as shown in the family room 102*c*. A junction box 120 may also route communications between two different automatically configurable devices 130 coupled to a junction box 120. In another embodiment, there is a one-to-one correspondence between junction boxes 120 and automatically configurable devices 130, as shown in the library 102*a*. In such an embodiment, junction boxes 120 so configured do not perform routing functions.

Each junction box 120 also includes configuration data 144. The configuration data 144 is utilized to configure the automatically configurable device(s) 130 coupled to the junction boxes 120. In particular, the configuration data 144 provides default configuration information for devices 130 attached to a junction box 120.

In one embodiment, configuration data 144 provides the attached device 130 with an assigned zone of interest 148. The zone of interest 148, with reference to FIG. 1, is a portion of the network that correlates to a region or area within the home 101 and is logically related to the attached device 130. The zone of interest 148 could correlate, for example, to a room 102, a set of rooms 102, or portions of one or more rooms 102 or areas within the home 101. Alternatively, the zone of interest 148 could comprise a set of interrelated devices 130 and/or junction boxes 120 within the network, although these devices 130 and/or junction boxes 120 may not be situated proximate each other within the home 101. For example, a zone of interest 148 may comprise all exterior lights 130 in the home 101, although some lights 130 are situated by the front of the home 101 and other lights 130 are situated by the back of the home 101.

Utilizing this system 100, an automatically configurable device 130, or another device within the network 140, searches within the zone of interest 148 to identify devices 130 that are compatible with the pertinent automatically configurable device 130. It should be understood that when, for example, a light switch 130*a*, 130*d*, 130*k*, 130*l* (e.g., an on/off switch or a dimmer switch) is coupled to the network 140, the switch 130*a*, 130*d*, 130*k*, 130*l* could control any one of the lights 130*b-c*, 130*e-f*, 130*i-j*, 130*m*, or any group of lights 130*b-c*, 130*e-f*, 130*i-j*, 130*m*, within the network 140. Utilizing the zone of interest 148, the device 130 coupled to a junction box 120 would search for compatible devices 130 only within the zone of interest 148, e.g., only for lights 130 within the pertinent room or portion of the room where the light switch 130*a*, 130*d*, 130*k*, 130*l* is situated. Accordingly, the search encompasses only devices 130 logically related to the pertinent automatically configurable device 130.

In one embodiment, each zone of interest 148 encompasses multiple devices 130 attached to a particular junction box 120. Zones of interest B, C, and D 140*b-d* of FIG. 1 provide examples of this type of a configuration. In such an embodiment, when a light switch 130*d*, 130*k*, 130*l* is attached to a particular junction box 120, it will examine all devices 130 coupled to that junction box 120 (i.e., the zone of interest 148) to identify compatible devices 130, i.e., devices 130 that may interact with the light switch 130*d*, 130*k*, 130*l*, such as a light 130*e-f*, 130*i-j*, 130*m*. Thereafter, the light switch 130*d*, 130*k*, 130*l* will be automatically configured to interact with the compatible devices 130. If the default configuration is not the configuration desired by the user, a user may manually override these settings.

In another embodiment, each junction box 120 is coupled to a single device 130. In such an embodiment, multiple junction boxes 120 may be included within a single zone. One example of this shown in FIG. 1 is zone of interest A 140*a*, in which multiple junction boxes 120*a-c* are encompassed by a single zone. Searches, in such an embodiment, may encompass all devices 130*a-c* within the zone of interest, although multiple junction boxes 120*a-c* are used. Of course, combinations of these two approaches may also be used.

In the embodiment illustrated in FIG. 1, each portion of the network 140 within each room comprises a separate zone of interest 148. As a result, a light switch 130*a*, coupled to a junction box 120*a* in the library 102*a* will by default control lights 130*b-c* within the library 102*a*; a light switch 130*d* coupled to the junction box 120*d* associated with the utility room 102*b*, will automatically control lights 130*e-f* within that room 102*b*; and so on. Of course, a single junction box 120 may encompass devices 130 within multiple rooms 102 or areas. Alternatively, a single room 102 or area may include multiple junction boxes 120. As a result, the zone of interest 148 may encompass a portion of a room 102 or area, or multiple rooms 102 or areas.

Automatic configuration is not limited to lights 130*b-c*, 130*e-f*, 130*i-j*, 130*m* and light switches 130*a*, 130*d*, 130*k*, 130*l*. Automatic configuration may utilize any two devices 130 within a network 140 that interact with each other. For example, a video providing device 130*g* (e.g., a DVD player or digital recording/playing device) may automatically detect the presence of a display screen 130*h* or vice versa. Utilizing the configuration data 144, the video providing device 130*g* may be configured to provide video signals to the display screen 130*h*.

Automatically configurable devices 130 may thus be embodied in a number of different ways. These types of devices 130 may, for example, include lights 130*b-c*, 130*e-f*, 130*i-j*, 130*m*, light switches 130*a*, 130*d*, 130*k*, 130*l*, a wall-mounted or wireless touch screens, ceiling fans, exhaust fans, thermostats (including zone-specific thermostats), furnaces, air conditioners, a gas fireplace and its switch(es), audio/video providing devices (tv's, stereo's, mp3 players, video games), volume/mute controls, audio speakers, a switched or 3-way electrical outlet and its switch(es), motion sensors, heat sensors, vibration sensors, smoke sensors, or disposals.

The automatically configurable devices 130, like a junction box 120, may comprise a processor and memory or, alternatively, may include only memory.

The network 140 depicted in FIG. 1 is a communication channel through which data signals may be transmitted between, for example, the master node 110, junction boxes 120, and automatically configurable devices 130. The network 140 may be embodied in various ways. For example, the network 140 may include local area networks (LANs), storage area networks (SANs), metropolitan area networks (MANs), wide area networks (WANs), or combinations thereof (e.g., the Internet) with no requirement that the devices in communication with each other reside at the same physical location, within the same network segment, or even within the same network. A variety of different network configurations and protocols may be used, including Ethernet, TCP/IP, UDP/IP, IEEE 802.11, IEEE 802.16, BLUETOOTH wireless communication protocol, asynchronous transfer mode (ATM), fiber distributed data interface (FDDI), token ring, wireless networks (e.g., 802.11g or a wireless telephone/data network), proprietary formulas, and so forth, including combinations thereof. Of course, some embodiments may also be practiced with conventional point-to-point connections, such as enterprise systems connection (ESCON), small computer system interface (SCSI), fibre channel, etc., that may not typically be viewed as a "network." The network 140 may also comprise, in one embodiment, an embedded device network produced by Matsushita Electric Works, Ltd. of Osaka, Japan. An embedded device network comprises distributed networks of requestors, providers, and intervening nodes that allow rapid re-routing of communication channels when network failures occur.

The embodiment illustrated in FIG. 1 is merely illustrative. For example, the disclosed system 100 may include many different types of automatically configurable devices 130, beyond those illustrated in FIG. 1. Also, the number of the automatically configurable devices 130 and junction boxes 120 may be varied within the scope of the disclosed systems and methods. Furthermore, in one configuration, the master node 110 may be omitted such that the system 100 may be embodied as a peer-to-peer network 240.

Automatic device configuration systems 100 provides significant advantages over manual configurations systems. Consider, for example, an office building that may utilize a manual configuration system. The office building may have literally hundreds or thousands of lights. When a light switch is connected to the network, it could be extraordinarily time-consuming to identify and sort through all the lights within the building and identify, for example, control numbers or control data for the lights in the pertinent room or area. In the disclosed system 100, the configuration data 144 in a junction box 120 provides for automatic configuration of the default or most likely situation. Automatic configuration operates without the cumbersome task of the manual identification of devices 130 and determining identification or control information for each of the devices 130 that may be compatible with the device 130 in question.

Figure 2:
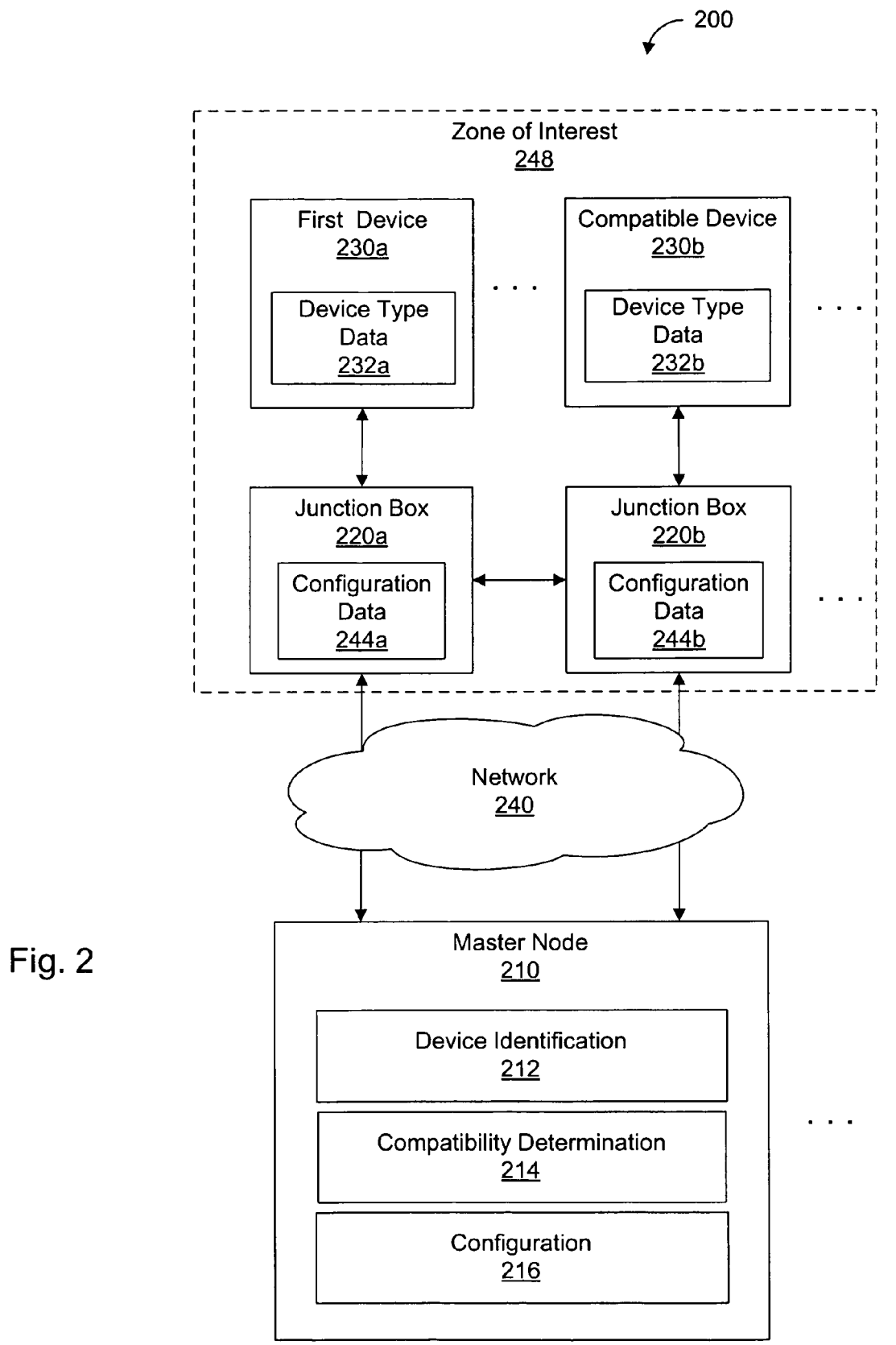
FIG. 2 is a block diagram illustrating one embodiment of an automatic device configuration system in which there is a one-to-one relationship between junction boxes and automatically configurable devices.

FIG. 2 is a block diagram illustrating one embodiment of an automatic device 230 configuration system 200. The system 200 illustrated in FIG. 2 includes a first automatically configurable device 230a coupled to a first junction box 220a, and a compatible device 230b coupled with a second junction box 220b. The depicted zone of interest 248 encompasses the first device 230a and the compatible device 230b. The system 200 further includes a network 240 and a master node 210.

As explained above, the network 240 may be embodied in various ways. The network 240 enables communication between the first device 230a, the compatible device 230b, the first and second junction boxes 220a-b, and the master node 210. The term network 240, as used herein, may encompass any type of electronic communication channel.

The first device 230a and the compatible device 230b include device type data 232a-b. The device type data 232 may be utilized to determine whether the first device 230a is compatible with the compatible device 230b, or other devices 230 within the zone of interest 248. The device type data 232 may identify what type of device 230 is at issue (e.g., a light switch or a light). The data 232 may further identify acceptable types of input and output parameters for controlling or determining the status of a particular device 230.

The system 200 also includes a first and a second junction box 220a-b. Each junction box 220 includes configuration data 244a-b. The configuration data 244 may be utilized to configure the first device 230a to interact with other devices 230 within the zone of interest 248, such as the compatible device 230b shown in FIG. 2.

As indicated in connection with FIG. 1, the configuration data may define a zone of interest 248. The zone of interest 248 encompasses logically related automatically configurable devices 230. In one embodiment, the zone of interest 248 may also include devices 230 that are not automatically configurable.

As illustrated in FIG. 2, the zone of interest 248 encompasses devices 230 with which the first device 230a may interact in an automated manner. As explained above, the zone of interest 248 could include devices 230 situated within a particular room or area of a building or home. As explained, the zone of interest 248 could further encompass related devices 230, such as lighting related devices 230 (e.g., other light switches and lights) or a controller switch and a garbage disposal.

In the illustrated embodiment, the configuration data 244a for the first junction box 220a provides that the first device 230a is situated within the zone of interest 248. The configuration data 244b of the second junction box 220b provides that the compatible device 230b is situated within the depicted zone of interest 248. The configuration data 244 may thus be utilized by the first device 230a, a compatible device 230b, a junction box 220, or the master node 210 to associate a pertinent device 230 with a specific zone of interest 248. Of course, the configuration data 244 provides only default assignments of devices 230 within particular zones of interest. These assignments may be changed by a user or system administrator.

The master node 210 depicted in FIG. 2 includes a device identification component 212, a compatibility determination component 214, and a configuration component 216. The device identification component 212 identifies devices 230 within the zone of interest 248, as defined by the configuration data 244. To identify pertinent devices 230, the device identification component 212 may simply search within the zone of interest 248. Alternatively, the device identification component 212 could retrieve a listing or database of devices 230 within the zone of interest 248. This listing or database could be stored, for example, on the master node 210 or a junction box 220.

The compatibility determination component 214 determines whether the devices 230 identified within the zone of interest 248 are compatible with the first device 230a. The compatibility determination component 214 may utilize, for example, device type data 232 from the compatible device 230b and from the first device 230a to determine whether these two devices 230 are compatible. The compatibility determination component 214 could access a database to determine compatibility. Such a database may be situated on a node within the network 240 or may be retrieved from a remote server via, for example, the Internet.

The configuration component 216 configures the first device 230a to interact with the compatible device 230b. The configuration component 216 may do so by reference to the device identification and compatibility determination components 212, 214 and/or device type data 232a-b for the first and compatible devices 230a-b. To enable interaction between the first device 230a and a compatible device 230b, the configuration component 216 may make alterations to settings of the first device 230a. Furthermore, the configuration component 216 may alter settings in the junction box 220, the compatible device 230b, and/or a master node 210 to properly transmit, receive, and route control signals or other data transmitted between the first device 230a and the compatible device 230b. The configuration component 216 could also alter settings within the first device 230a, the compatible device 230b, junction box 220, or master node 210 to ensure that incoming and outgoing signals are in a compatible format or protocol.

The configuration component 216 could control routing of signals between the first device 230a and the compatible device 230b. For example, the first device 230a could alter the junction box 220 or the master node 210 to ensure that signals transmitted from the first device 230a are received at the compatible device 230b and vice versa.

The disclosed system 200 may be embodied in a number of different ways beyond the configuration shown in FIG. 2. For example, the device identification component 212, compatibility determination component 214, and configuration component 216 are not necessarily situated within the master node 210. Instead, one or more of these components 212, 214, 216 may be situated within one of the junction boxes 220, or the first or compatible devices 230a-b. Furthermore, device type data 232 is not necessarily stored within the first or compatible device 230a-b. For example, a device type data 232 may be stored by or transferred to the junction box 220 or the master node 210. The device type data 232 does not necessarily originate from the device 230 itself. For example, the device type data 232 could be manually input into the device 230, a junction box 220, or a master node 210.

Figure 3:
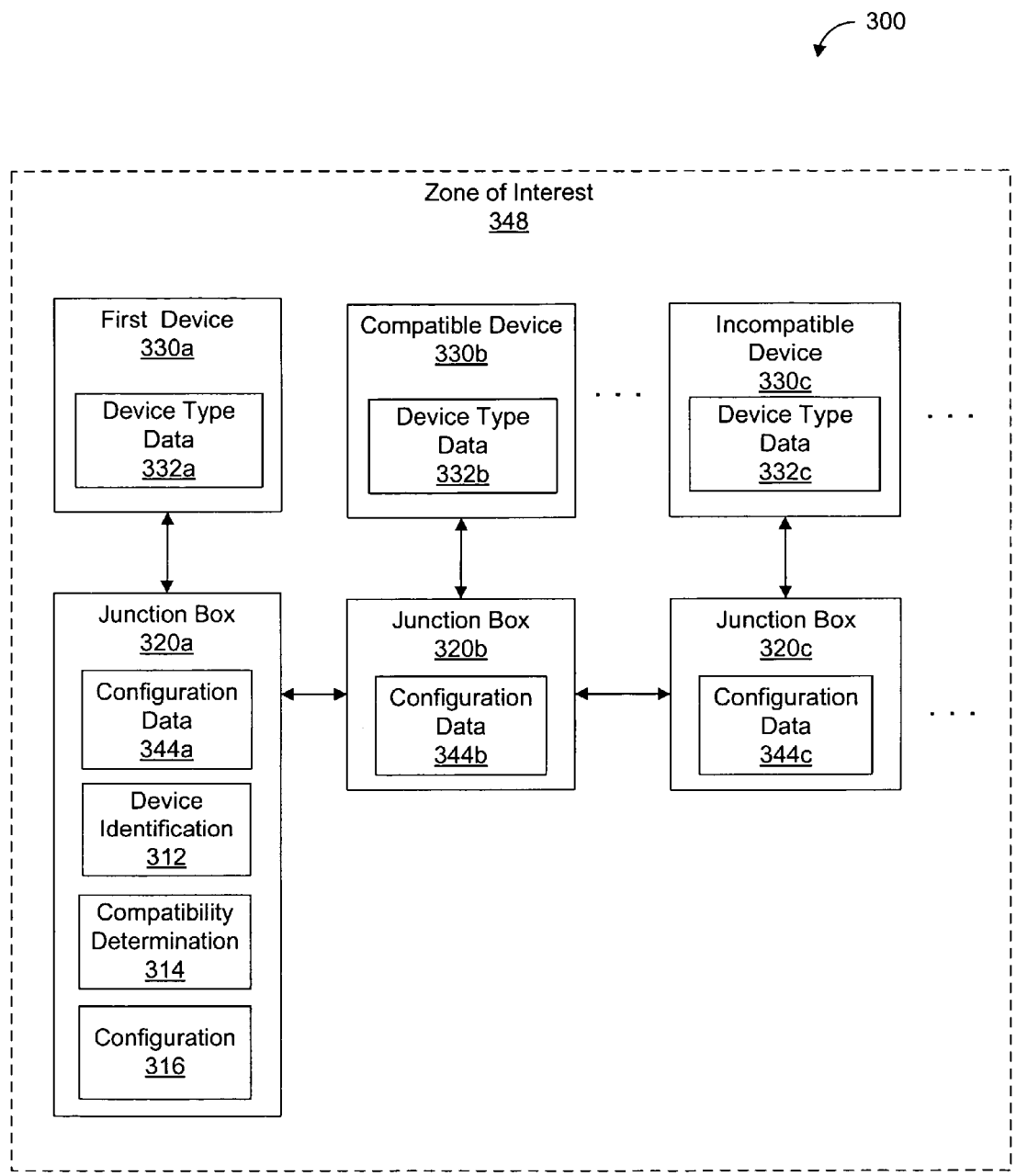
FIG. 3 is a block diagram of an alternate embodiment of an automatic configuration system shown in a peer-to-peer configuration.

FIG. 3 is a block diagram illustrating an alternative embodiment of an automatic node configuration system 300. The system 300 illustrated in FIG. 3 includes a first device 330a, a compatible device 330b, and an incompatible device 330c situated within a depicted zone of interest 348.

Once again, each of the devices 330 is coupled to a junction box 320. The devices 330 and junction boxes 320a-c are in electronic communication with each other via an electronic communication channel, which may include a network. For simplicity, the network is not shown.

In contrast to the embodiment shown in FIG. 2, the embodiment of FIG. 3 does not include a master node. Accordingly, the system 300 is organized in a type of peer-to-peer networking configuration.

As with the embodiment shown in FIG. 2, each of the devices 330a-c includes device type data 332a-c. Again, this device type data 332 identifies the type of device 330 at issue and could identify proper protocols or formats for incoming and outgoing data signals.

Again, each junction box 320a-c includes configuration data 344a-c. This configuration data 344 enables automatic configuration of coupled devices 330. The configuration data 344 also identifies the zone of interest 348 to which a connected device 330 is assigned by default.

Furthermore, one of the junction boxes 320, the first junction box 320a, includes a device identification component 312, a compatibility determination component 314, and a configuration component 316.

The device identification component 312, compatibility determination component 314, and configuration component 316 function in generally the same manner as the analogous components 212, 214, 216 shown in FIG. 2. One difference is, of course, that these components 312, 314, 316 shown in FIG. 3 operate from within a junction box 320, rather than a master node 210. As before, utilizing these components 312, 314, 316, the first device 330a may be automatically configured to interact with the compatible device 330b.

Further, the compatibility determination component 314 will determine that the incompatible device 330c is not compatible with the first device 330a. As a result, the system 300 will not configure the first device 330a to interact with the incompatible device 330c. An example of incompatible devices 330c could be a light switch and a DVD player. While one certainly could utilize a light switch to turn off and on a DVD player, this type of association is typically not utilized and thus these two types of devices 330 could be defined to be logically "incompatible." Other devices may be simply "incompatible" in that they could not interact with each other.

The embodiment illustrated in FIG. 3 may be configured in a number of different ways. For example, one or more of the device identification, the compatibility determination, and configuration components 312, 314, 316 may be situated on different junction boxes 320 or on one of the devices 330a-c. Furthermore, the system 300 may include many compatible devices 330b and many incompatible devices 330c, not simply the single compatible device 330b and single incompatible device 330c shown in FIG. 3. As indicated, not all devices within the system 300 are necessarily automatically configurable. Of course, as explained in connection with FIG. 1, an automatic device 330 configuration system 300 may include many zones of interest 348, not merely the single zone of interest 348, as shown in FIGS. 2 and 3.

Figure 4:
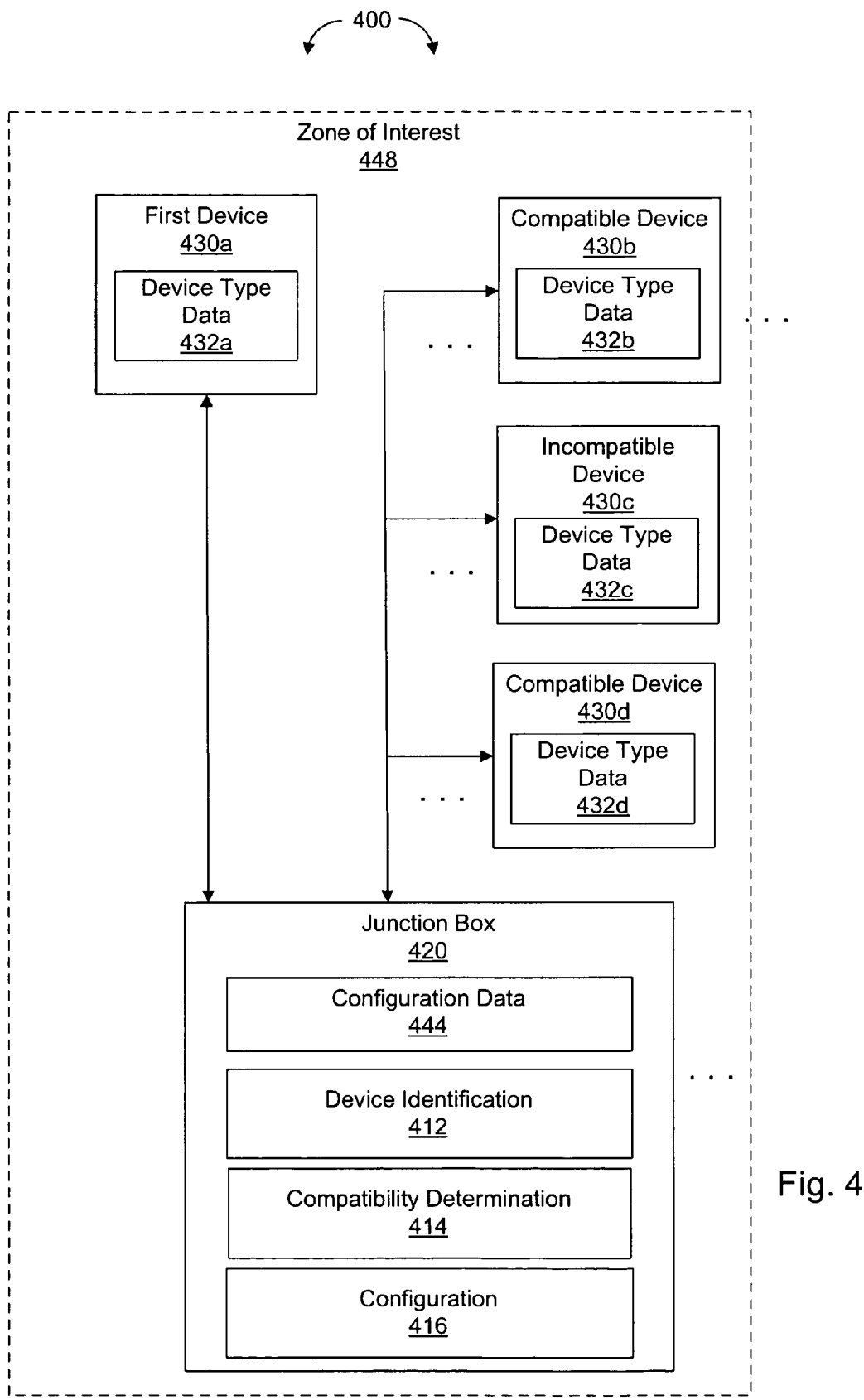
FIG. 4 is a block diagram illustrating one embodiment of an automatic device configuration system in which a single junction box is coupled to multiple automatically configurable devices.

FIG. 4 is a block diagram illustrating an alternative embodiment of an automatic node configuration system 400. As with previously disclosed embodiments, the system 400 includes a first device 430a and one or more compatible or incompatible devices 430b-d within a zone of interest 448. Each device 430 includes device type data 432 that identifies, for example, the type of devices 430 at issue. For simplicity, the network is not shown.

A junction box 420 is also included in this system 400. However, the junction box 420 is coupled to the first device 430a and a number of compatible and incompatible devices 430b-d, not just a single device 430. In other words, there is not a one-to-one relationship between the devices 430 and junction boxes 420.

In the disclosed embodiment, the junction box 420 includes configuration data 444 for each of the devices 430 connected to the junction box 420. The connected devices 430 may inherit, or utilize, the configuration data 444. Again, the configuration data 444 provides a default zone of interest assignment for each of the connected devices 430.

The junction box 420 includes a device identification component 412, a compatibility determination component 414, and a configuration component 416. Once again, these components 412, 414, 416 may function generally in the same manner as the analogous components 212, 312, 214, 314, 216, 216 shown in FIGS. 2 and 3. In particular, the device identification component 412 identifies devices 430 within the zone of interest 448. The compatibility determination component 414 determines which devices 430 within the zone of interest 448 are compatible with the first device 430a. The configuration component 416 alters the configurations of the devices 430 and/or junction box 420 to enable the first device 430a to interact with the compatible devices 430b, 430d.

The system 400 disclosed in FIG. 4 is only illustrative. Variations of the embodiment shown in FIG. 4 include a system 400 with many junction boxes 420 and many zones of interest 448. One embodiment of the illustrated system 400 may include multiple junction boxes 420, each junction box 420 being connected to multiple devices 430. In such an embodiment, the junction boxes 420 and each set of connected devices 430 may be in the same zone 448 or different zones 448. Furthermore, multiple devices 430 coupled to a single junction box 420 may be assigned to separate zones. For example, lighting devices 430 connected to a junction box 420 may be assigned to one zone 448, while audio or video devices 430 connected to the same junction box 420 may be assigned to a different zone 448. Once again, the device identification component 412, compatibility determination component 414 and configuration component 416 comprise portions of one or more of the illustrated devices 430.

Figure 5:
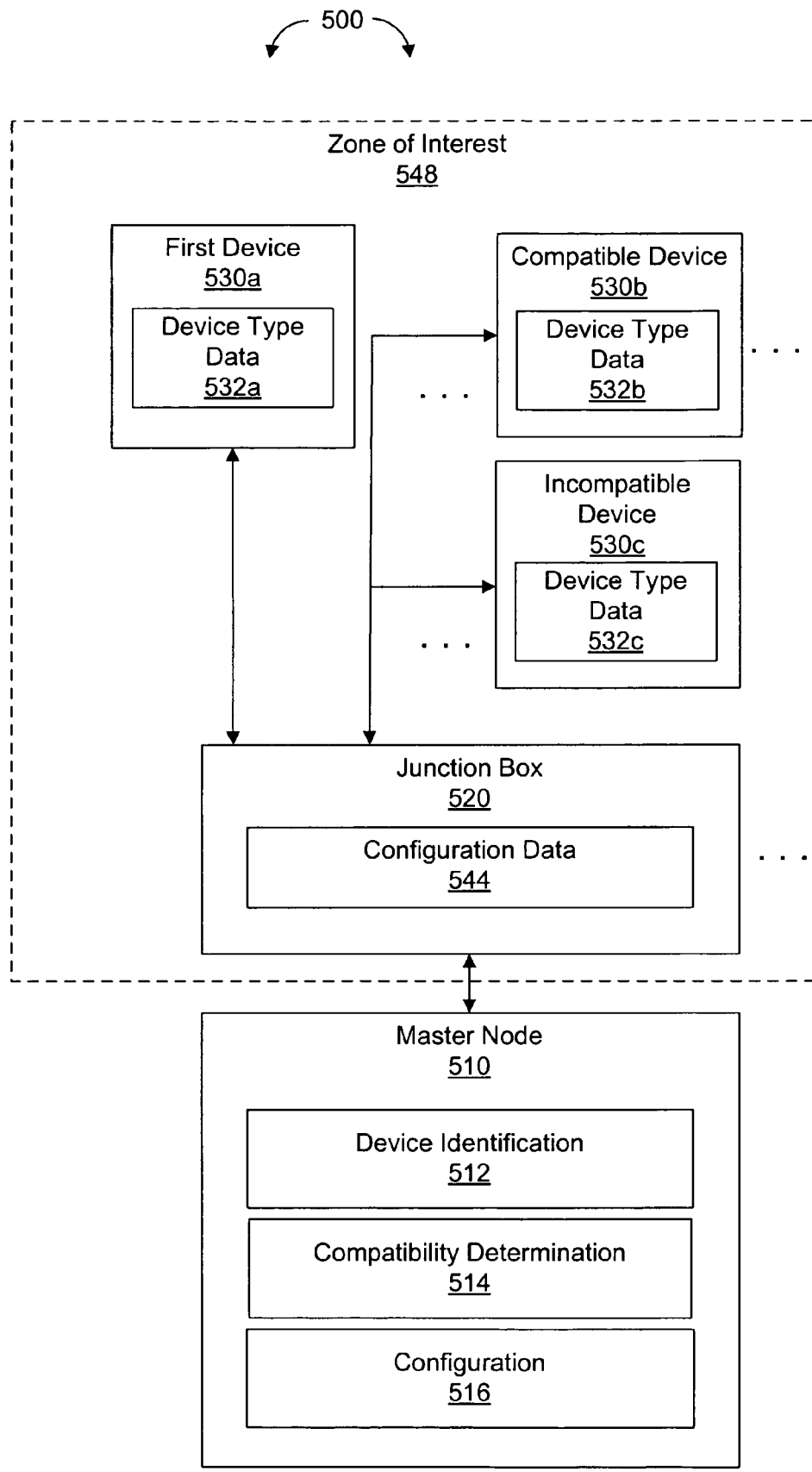
FIG. 5 is the block diagram illustrating an alternative embodiment of an automatic device configuration system including multiple automatically configurable devices coupled to a single junction box and further including a master node.

FIG. 5 is a block diagram illustrating yet another embodiment of an automatic node configuration system 500. In the disclosed embodiment (as with the embodiment shown in FIG. 4), multiple devices 530a-c are connected to a single junction box 520. The devices 530 shown are included within the same zone of interest 548. Each of the devices 530a-c includes device type data 532a-c, as previously discussed. For simplicity, the network is not shown.

Furthermore, as with previous embodiments, the junction box 520 includes configuration data 544. The configuration data 544 may be utilized, or inherited, by each of the devices 530 to define a default zone assignment for those devices 530.

The disclosed system 500 also includes a master node 510. The master node 510 may be coupled to other junction boxes 520, which, for simplicity, have not been shown in FIG. 5.

The master node 510 includes a device identification component 512, a compatibility determination component 514, and a configuration determination component 516. Yet again, these components 512, 514, 516 function in the same way as analogous components (e.g., components 212, 214, 216 of FIG. 2) explained in connection with previously disclosed embodiments. The primary difference, however, is that these components reside on the master node 510.

The embodiment illustrated in FIG. 5 is only illustrative. For example, the number of devices 530 within each zone of interest 548 may be varied within the scope of the disclosed system 500. The number of zones 548 included in the system 500 may also be varied. In addition, one or more of the device identification component 512, the compatibility determination component 514, and configuration component 516 may be encompassed by one or more of the devices 530 or junction boxes 520.

Figure 6:
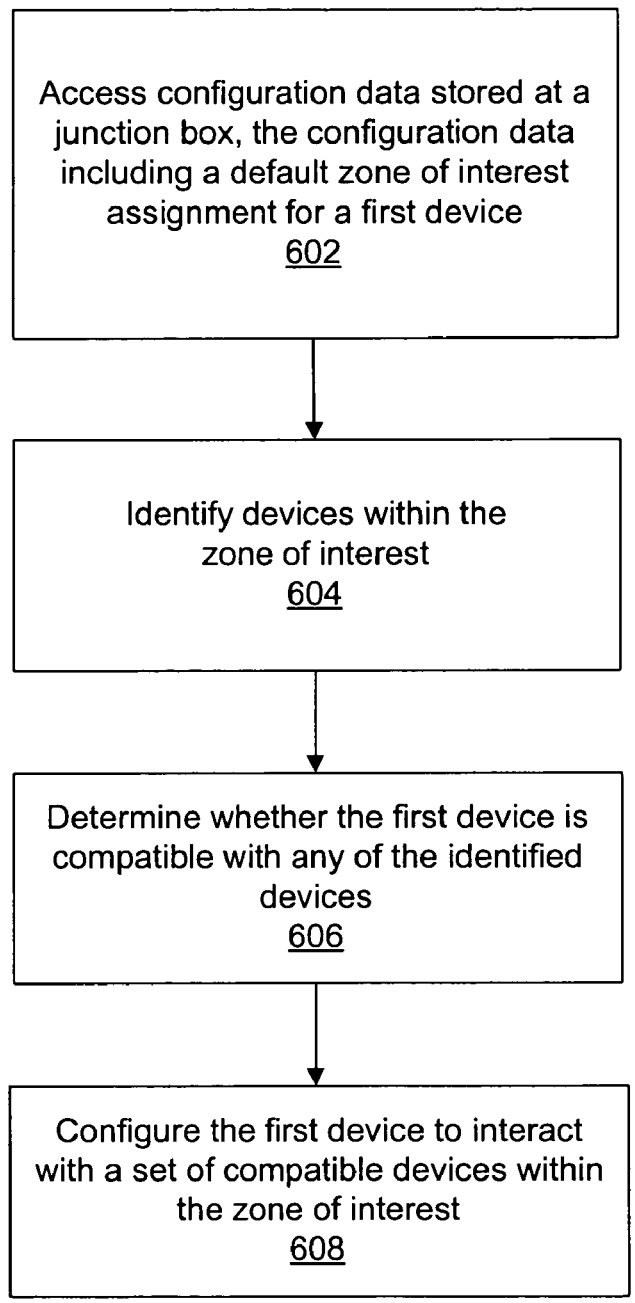
FIG. 6 is a flow diagram illustrating one embodiment of a method for automatic configuration of devices within a network.

FIG. 6 is a flow diagram illustrating one embodiment of a method 600 for automatic device configuration of a first device 530a within a network 240. A junction box 520 and a first device 530a are in electronic communication with each other.

Configuration data stored at a junction box is accessed 602. The configuration data includes a default zone of interest assignment for a first device. The default zone of interest assignment is utilized to assign the first device to a zone of interest within the network. The configuration data does not necessarily have to be accessed 602 by the first device. Instead, the configuration data may be accessed 602 by another device within the network, such as a compatible or incompatible device, a junction box, or a master node. Configuration data received from a junction box is referred to as "inherited" configuration data.

Devices 530 within the zone of interest are then identified 604. These devices may include, for example, light switches, lights, video providing devices, and display devices. These devices may be identified 604 by scanning the zone of interest or, alternatively, by retrieving a previously-compiled list of devices within the zone of interest.

Thereafter, it is determined 606 whether the first device is compatible with any of the identified devices. Compatibility may be determined 606 by reference to, for example, device type data stored at each of the devices within the zone of interest, including device type data stored at the first device. Alternatively, a database identifying compatible devices may be accessed to make this determination.

The first device is then configured 608 to interact with a set of compatible devices within the zone of interest. The set of compatible devices may include only one device or may include many devices. This configuration may involve alterations of settings and states of the first device, junction boxes, a master node, or other devices within the zone of interest.

The method 600 explained in connection with FIG. 6 may be utilized in connection with a wide variety of systems and configurations. For example, a junction box may be connected to (i.e., in direct or indirect electronic communication with) one or more devices. In one embodiment, there is a one-to-one relationship between junction boxes and devices, i.e., there is one junction box for each device within a zone of interest, a portion of a zone of interest, a network, or a portion of a network. In one embodiment, a single zone of interest may include devices with a one-to-one relationship with a junction box, and junction boxes connected to multiples devices.

Furthermore, one or more of tasks of accessing configuration data, identifying devices within the zone of interest, determining compatibility, and configuring the first device to interact with compatible devices may be performed by various devices within an associated network. These tasks may be performed by the first device, compatible or incompatible devices, a junction box, or a master node.

Also, in one embodiment, when a device 530 is no longer attached to junction box 520 it no longer retains information about the zone of interest assignment. When such a device 530 is attached to another junction box 520, it will "inherit" or receive a zone of interest assignment from the new junction box 520. Alternatively, a device 530 may retain the zone of interest assignment even when it has been moved to another location or attached a different junction box 520.

Configuration, in one embodiment, is performed in an automated manner. Automated configuration is performed by a computing device. However, configuration in an automated manner is not meant to exclude interaction with users. For example, a system may propose a configuration or group of likely configurations, which a user may confirm or choose between.

In one embodiment, the first device may control at least one aspect of a device within a set of compatible devices. For example, the first device may be a light switch, and the set of compatible devices may include a light. The first device could be a video providing device and the set of compatible devices could include a display device, such as a television set. Of course, there is no requirement that the controlling device be the first device. Accordingly, a light or a display screen may be the first device. In one embodiment, the first device may be an embedded device, and the network in which the method 600 is utilized may be an embedded device network. Further, compatible devices 530, in one embodiment, may determine their zone of interest assignments, or receive them, from the corresponding junction boxes 520 based on configuration data 544. Furthermore, a junction box 520, first device 530a, or compatible device 530b-c may be within multiple zones. Also, a junction box 520 could include multiple sets of configuration data 544 and assign devices 530 to one or more of various zones 548 depending on a set of criteria, such as the type of device 530.

Figure 7:
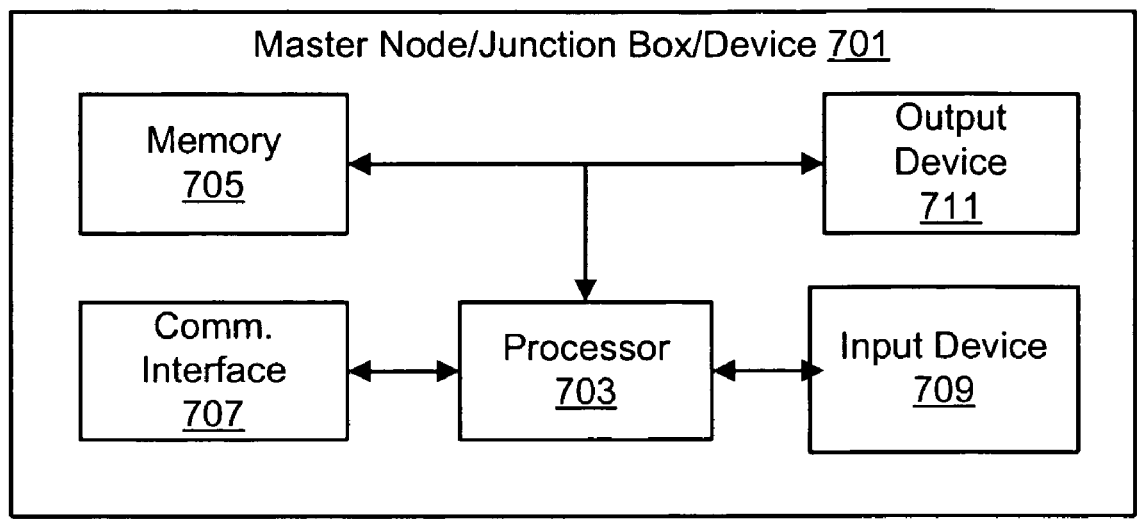
FIG. 7 is a block diagram illustrating the major hardware components typically utilized in master node, junction box, and/or an automatically configurable device.

FIG. 7 is a block diagram illustrating the major hardware components typically utilized in a master node 510, an automatically configurable device 530, or a junction box 520 (collectively, a "device" 701). The illustrated components may be located within the same physical structure or in separate housings or structures.

The device 701 may optionally include a processor 703. The processor 703 controls the operation of the device 701 and may be embodied as a microprocessor, a microcontroller, a digital signal processor (DSP) or other device known in the art. The processor 703 typically performs logical and arithmetic operations based on program instructions stored within the memory 705. Certain embodiments of the junction box and/or an automatically configurable device include a processor 703, while other embodiments may include only memory 705 and no processor 703.

As used herein, the term memory 705 is broadly defined as any electronic component capable of storing electronic information, and may be embodied as read only memory (ROM), random access memory (RAM), magnetic disk storage media, optical storage media, flash memory devices in RAM, on-board memory included with the processor 703, EPROM memory, EEPROM memory, registers, etc. The memory 705 typically stores program instructions and other types of data. The program instructions may be executed by the processor 703 to implement some or all of the methods disclosed herein. With respect to a junction box, memory may be used to store configuration data. Memory utilized in an automatically configurable device may store device type data 532 and/or configuration settings for the automatically configurable device 530.

The device 701 may optionally include one or more communication interfaces 707 for communicating with other electronic devices. The communication interfaces 707 may be based on wired communication technology, wireless communication technology, or both. Examples of different types of communication interfaces 707 include a serial port, a parallel port, a Universal Serial Bus (USB), an Ethernet adapter, an IEEE 1394 bus interface, a small computer system interface (SCSI) bus interface, an infrared (IR) communication port, a BLUETOOTH wireless communication protocol wireless communication adapter, and so forth.

The device 701 may include one or more input devices 709 and one or more output devices 711. Examples of different kinds of input devices 709 include a keyboard, mouse, microphone, remote control device, button, joystick, trackball, touchpad, lightpen, etc. Examples of different kinds of output devices 711 include a speaker, printer, display device, etc. While a master node 520 may typically include a display device, junction boxes 520 and automatically configurable devices 532 will frequently not include a display device.

Of course, FIG. 7 illustrates only one possible configuration of a device 701. Various other architectures and components may be utilized.

The device 701 may be embodied in various ways, such as a personal computer, laptop computer, server, tablet PC, or embedded device. The device 701 working in conjunction with software or embedded programming may be utilized to perform the systems and methods disclosed herein.

The present systems and methods may be used in several contexts. For example, automatic device configuration systems and methods may be utilized to setup and/or modify monitoring and control systems for a home, building, set of buildings, or outdoor regions or facilities. Examples of these control and monitoring systems are disclosed in FIGS. 8-10. Junction boxes are not shown in FIGS. 8-10, but may be utilized in the same manner as explained in connection with the prior figures to identify pertinent zones of interest. In certain embodiments, the master node 510 is identified, for example, as a lighting controller system 808 (shown in FIG. 8), a security controller system 908 (shown in FIG. 9), and a home controller system 1008 (shown in FIG. 10).

Figure 8:
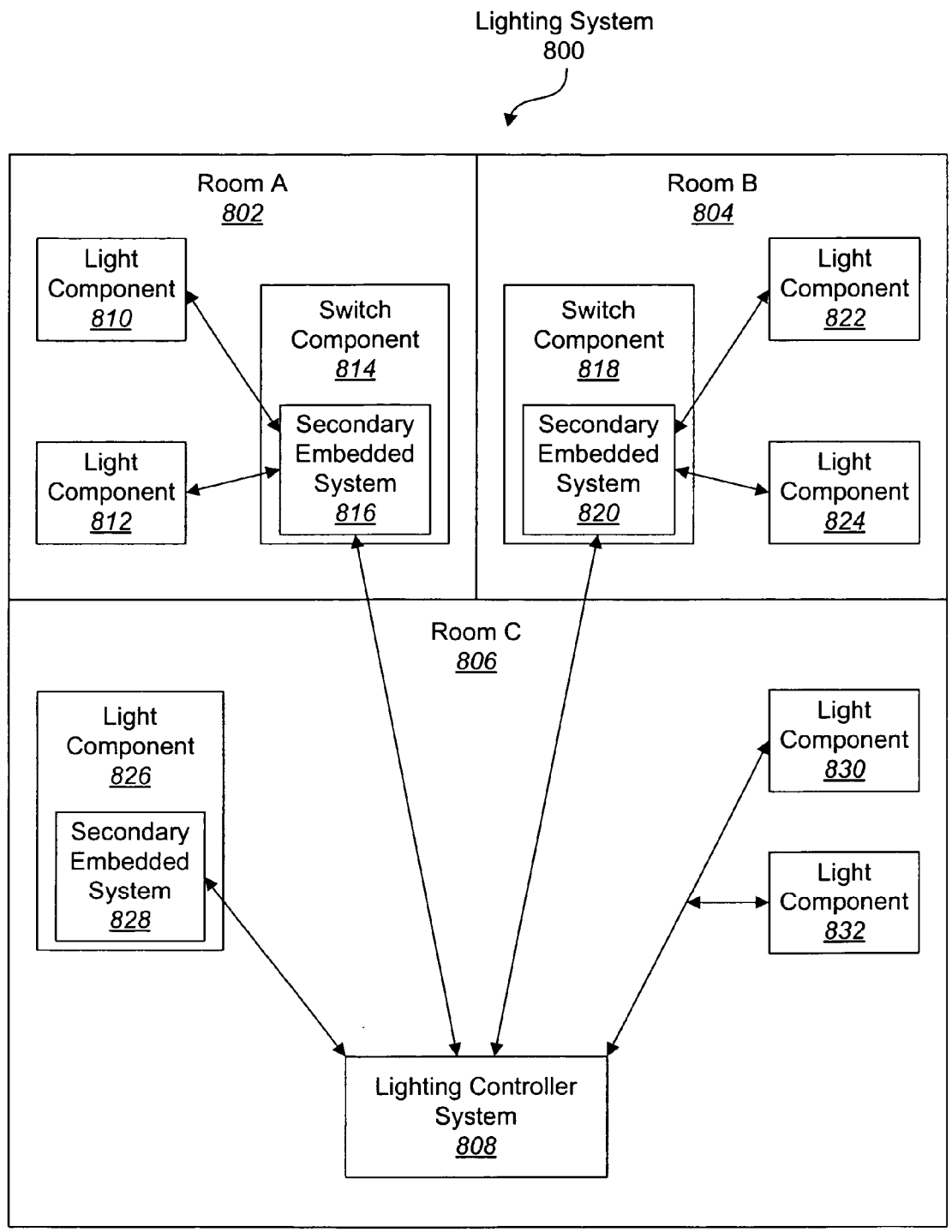
FIG. 8 is a block diagram illustrating a lighting system that may be utilized in connection with the disclosed systems and methods for automatic configuration of a device coupled to a network.

FIG. 8 is a block diagram that illustrates one embodiment of a lighting system 800 that includes a lighting controller system 808. The lighting system 800 of FIG. 8 may be incorporated, for example, into various rooms within a home. As illustrated, the system 800 includes a room A 802, a room B 804, and a room C 806. This system 800 may be implemented in any number and variety of rooms within a home, dwelling, building, or other environment.

The lighting controller system 808 may monitor and control additional embedded systems and components within the system 800. In one embodiment, room A 802 and the room B 804 each include a switch component 814, 818. The switch components 814, 818 may also include a secondary embedded system 816, 820. The secondary embedded systems 816, 820 may receive instructions from the central lighting controller system 808. The secondary embedded systems 816, 820 may then execute these instructions. The instructions may include powering up or powering down various light components 810, 812, 822, and 824. The instructions may also include dimming or increasing the brightness of the various light components 810, 812, 822, and 824. The instructions may further include arranging the brightness of the light components 810, 812, 822, and 824 in various patterns. The secondary embedded systems 816, 820 may also facilitate monitoring and controlling each light component 810, 812, 822, and 824 through the central embedded system 808.

The lighting controller system 808 might also provide instructions directly to a light component 826 that includes a secondary embedded system 828 in room C 806. The central embedded system 808 may, for example, instruct the secondary embedded system 828 to power down or power up the individual light component 826. Similarly, the instructions received from the central embedded system 808 may include dimming or increasing the brightness of the individual light component 826. The lighting controller system 808 may also monitor and provide instructions directly to individual light components 830, 832 within the system 800.

Figure 9:
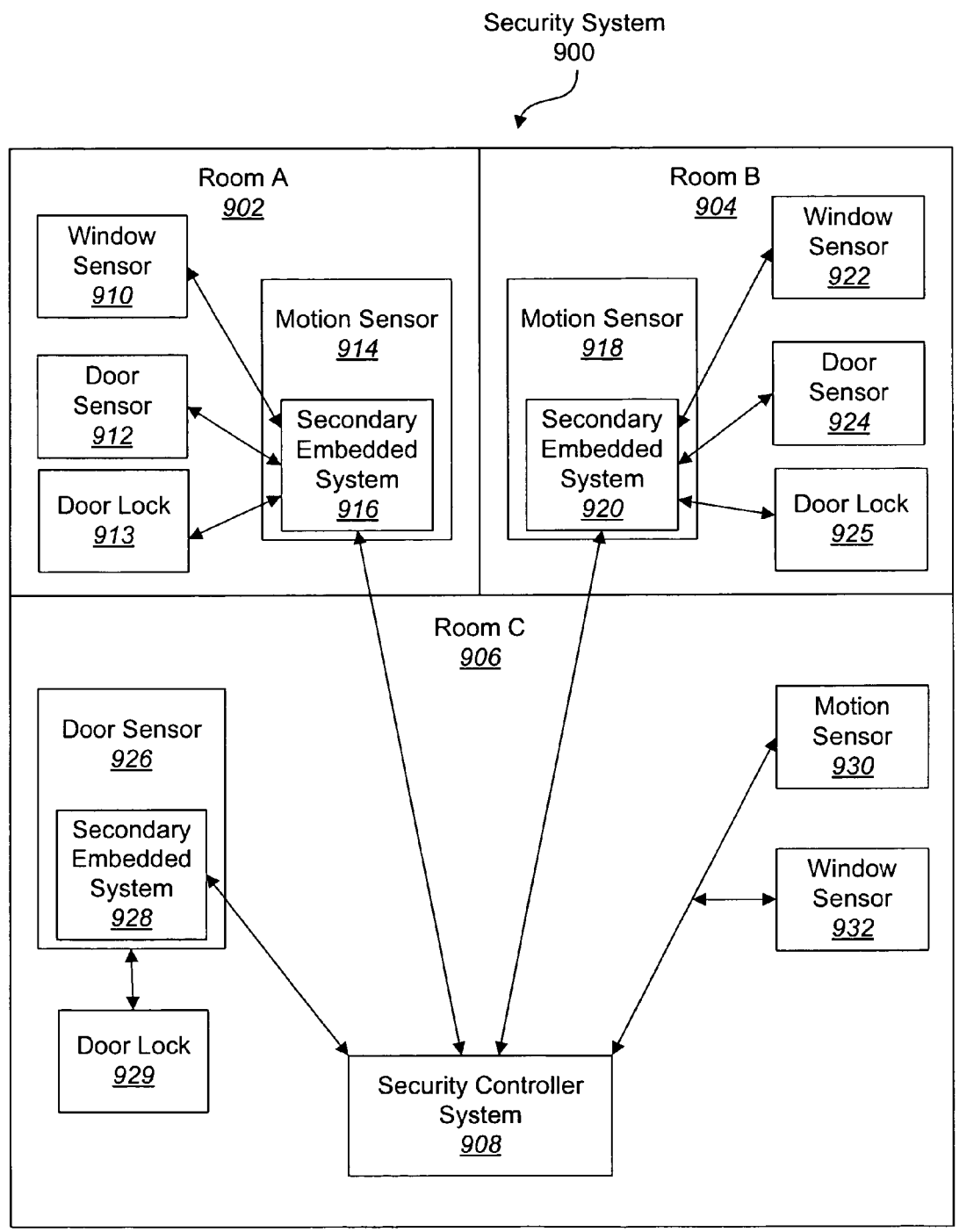
FIG. 9 is a block diagram illustrating a security system that may be utilized in connection with the disclosed systems and methods for automatic configuration of a device coupled to a network.

FIG. 9 is a block diagram illustrating one embodiment of a security system 900. As with the lighting system, the security system 900, in the depicted embodiment, is implemented in a room A 902, a room B 904, and a room C 906. These rooms may be in the confines of a home or other enclosed environment. The system 900 may also be implemented in an unenclosed environment where the rooms A, B and C, 902, 904, 906 represent territories or boundaries.

The system 900 includes a security controller system 908. The security controller system 908 monitors and receives information from the various components within the system 900. For example, motion sensors 914, 918 in rooms A and B 902, 904 may each include a secondary embedded system 916, 920. The motion sensors 914, 918 may monitor an area for motion and alert the security controller system 908 when motion is detected via the secondary embedded systems 916, 920. The security controller system 908 may also provide instructions to the various components within the system 900. For example, the security controller system 908 may provide instructions to the secondary embedded systems 916, 920 to power up or power down a window sensor 910, 922, a door sensor 912, 924, or a door lock 913, 925. In one embodiment, the secondary embedded systems 916, 920 notify the security controller system 908 when the window sensors 910, 922 detect movement of a window. Similarly, the secondary embedded systems 916, 920 notify the security controller system 908 when the door sensors 912, 924 detect movement of a door.

The security controller system 908 may also monitor and provide instructions directly to individual components within the system 900. For example, the security controller system 908 may monitor and provide instructions to power up or power down a motion or window sensor 930, 932.

Each individual component comprising the system 900 may also include a secondary embedded system. For example, FIG. 9 illustrates a door sensor 926 including a secondary embedded system 928. An electronic door lock 929 is also shown. The security controller system 908 may monitor and provide instructions to the secondary embedded system 928 as similarly described above.

Figure 10:
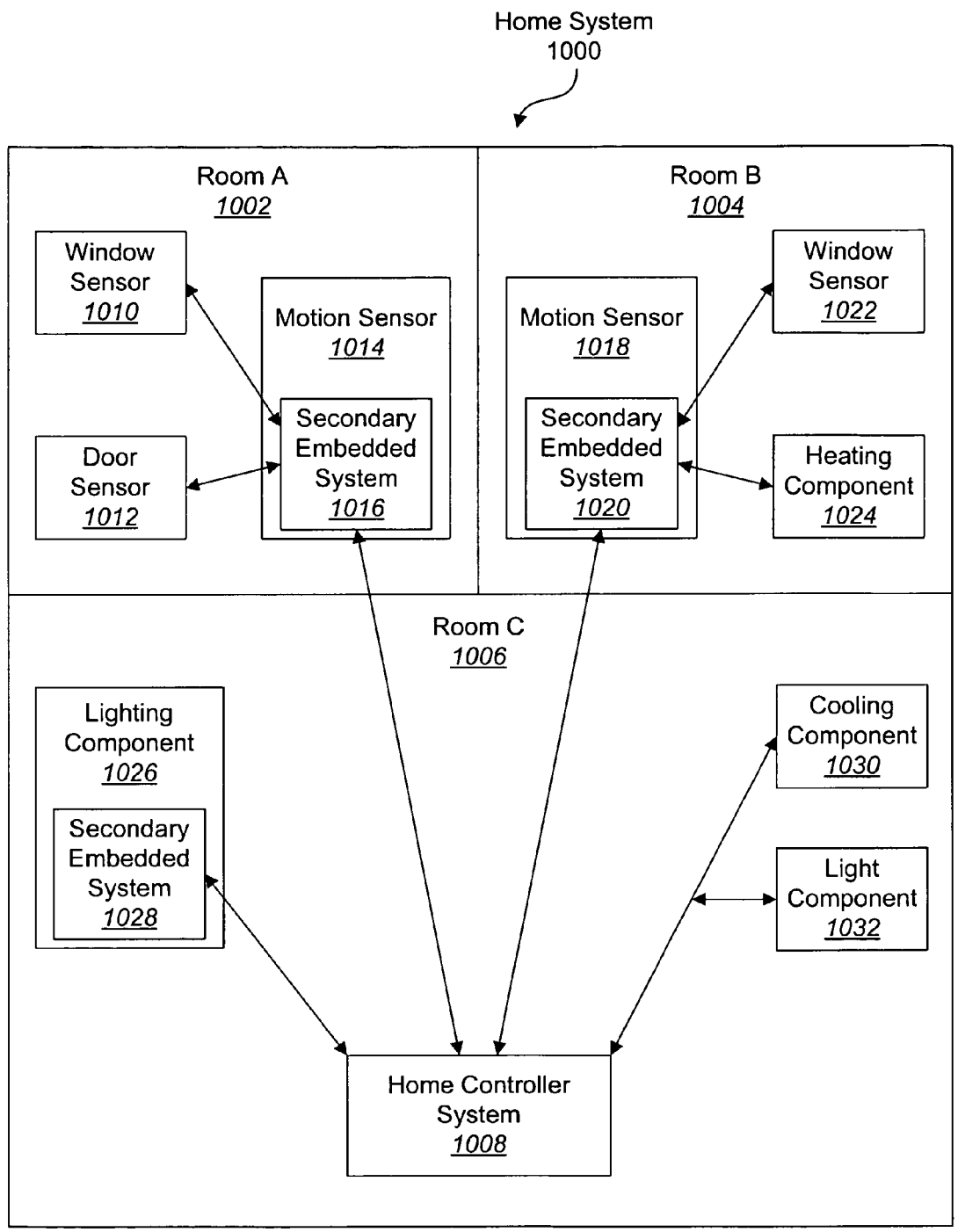
FIG. 10 is a block diagram illustrating a home system that may be utilized in connection with the disclosed systems and methods for automatic configuration of the device coupled to a network.

FIG. 10 is a block diagram illustrating one embodiment of a home system 1000. The home system 1000 includes a home controller system 1008 that facilitates the monitoring of various systems, such as the lighting system 800, the security system 900, and the like. The home system 1000 allows a user to control various components and systems through one or more embedded devices. In one embodiment, the home controller system 1008 monitors and provides information in the same manner as previously described in relation to FIGS. 8 and 9. In the depicted embodiment, the home controller system 1008 provides instructions to a heating component 1024 via a secondary embedded system 1020. The heating component 1024 may include a furnace or other heating device typically found in resident locations or offices. The home controller system 1008 may provide instructions to power up or power down the heating component 1024 via the secondary embedded system 1020.

Similarly, the home controller system 1008 may monitor and provide instructions directly to a component within the home system 1000, such as a cooling component 1030. The cooling component 1030 may include an air conditioner or other cooling device typically found in resident locations or offices. The home controller system 1008 may instruct the cooling component 1030 to power up or down depending on the temperature reading collected by the home controller system 1008. The home system 1000 functions in a similar manner as previously described in relation to FIGS. 8 and 9.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for automatic device configuration based on inherited configuration data comprising:

accessing configuration data stored at a junction box in electronic communication with a first device, the junction box being separate from the first device, wherein the junction box is a box with one open side mounted within a wall or a ceiling, and wherein the first device is inserted into the junction box, wherein the configuration data includes a default zone of interest assignment for the first device, wherein the first device is assigned to the default zone of interest based on the configuration data, the zone of interest comprising a portion of a network, and wherein the portion of the network is less than the entire network;

identifying devices only within the zone of interest and not outside the zone of interest, wherein the identifying occurs by scanning the zone of interest or accessing a database;

determining whether the first device is compatible with any of the identified devices; and configuring, in an automated manner, the first device to interact with at least one of the devices within a set of compatible devices in the zone of interest, wherein a master node that communicates with the junction box and the first device, the master node comprising a device identification component, a compatibility component and a configuration component, wherein the device identification component identifies the devices within the network and informs the first device of devices that have been identified, wherein the compatibility determination component determines whether the first device is compatible with any of the identified devices, and wherein the configuration component configures the first device to interact with one or more of the compatible devices.

2. The method of claim 1, wherein the first device controls at least one aspect of a device within the set of compatible devices.

3. The method of claim 1, wherein a first device is a light switch and the set of compatible devices comprises at least one light.

4. The method of claim 1, wherein the first device is a video providing device and the set of compatible devices includes a display device.

5. The method of claim 1, wherein the first device is an embedded device.

6. The method of claim 1, wherein the network comprises an embedded device network.

7. The method of claim 1, wherein the junction box is coupled to a single device.

8. The method of claim 1, wherein the junction box is coupled to multiple devices.

9. A system that is configured for automatic device configuration based on inherited configuration data, the system comprising:

a junction box comprising configuration data, wherein the junction box is a box with one open side mounted within a wall or a ceiling, and wherein the first device is inserted into the junction box;

a first device in electronic communication with the junction box;

a processor either comprised within or in electronic communication with the junction box or the first device;

memory in electronic communication with the processor; and instructions stored in the memory, the instructions being executable to:

access the configuration data stored at the junction box, the junction box being separate from the first device, wherein the configuration data includes a default zone of interest assignment for the first device, wherein the first device is assigned to the default zone of interest based on the configuration data, the zone of interest comprising a portion of a network, and wherein the portion of the network is less than the entire network;

identify devices only within the zone of interest and not outside the zone of interest, wherein the devices are identified by scanning the zone of interest or accessing a database;

determine whether the first device is compatible with any of the identified devices;

configure, in an automated manner, the first device to interact with at least one of the devices within a set of compatible devices in the zone of interest; and a master node that communicates with the junction box and the first device, the master node comprising a device identification component, a compatibility component and a configuration component, wherein the device identification component identifies the devices within the network and informs the first device of devices that have been identified, wherein the compatibility determination component determines whether the first device is compatible with any of the identified devices, and wherein the configuration component configures the first device to interact with one or more of the compatible devices.

10. The system of claim 9, wherein the first device controls at least one aspect of a device within the set of compatible devices.

11. The system of claim 9, wherein a first device is a light switch and the set of compatible devices comprises at least one light.

12. The system of claim 9, wherein the first device is a video providing device and the set of compatible devices includes a display device.

13. The system of claim 9, wherein the first device is an embedded device.

14. The system of claim 9, wherein the network comprises an embedded device network.

15. A non-transitory computer-readable medium comprising executable instructions for automatic device configuration based on inherited configuration data, the instructions being executable to:

access configuration data stored at a junction box in electronic communication with a first device, the junction box being separate from the first device, wherein the junction box is a box with one open side mounted within a wall or ceiling, and wherein the first device is inserted into the junction box, and wherein the configuration data includes a default zone of interest assignment for the first device, wherein the first device is assigned to the default zone of interest based on the configuration data, the zone of interest comprising a portion of a network, and wherein the portion of the network is less than the entire network;

identify devices only within the zone of interest and not outside the zone of interest, wherein the devices are identified by scanning the zone of interest or accessing a database;

determine whether the first device is compatible with any of the identified devices; and configure, in an automated manner, the first device to interact with at least one of the devices within a set of compatible devices in the zone of interest, wherein a master node that communicates with the junction box and the first device, the master node comprising a device identification component, a compatibility component and a configuration component, wherein the device identification component identifies the devices within the network and informs the first device of devices that have been identified, wherein the compatibility determination component determines whether the first device is compatible with any of the identified devices, and wherein the configuration component configures the first device to interact with one or more of the compatible devices.

16. The non-transitory computer-readable medium of claim 15, wherein the first device controls at least one aspect of a device within the set of compatible devices.

17. The non-transitory computer-readable medium of claim 15, wherein the first device is a light switch and the set of compatible devices comprises at least one light.

18. The non-transitory computer-readable medium of claim 15, wherein the first device is a video providing device and the set of compatible devices includes a display device.

19. The non-transitory computer-readable medium of claim 15, wherein the first device is an embedded device.

20. The non-transitory computer-readable medium of claim 15, wherein the network comprises an embedded device network.

21. The method of claim 1, wherein the zone of interest corresponds to an area.

22. The method of claim 21, wherein when the first device is no longer in electronic communication with the junction box, the first device no longer retains the assignment to the zone of interest.

23. The system of claim 9, wherein the configuration component controls the routing of signals between the first device and the one or more compatible devices.

24. The system of claim 23, wherein the first device is a light switch.

* * * * *